United States Patent Office 3,336,165
Patented Aug. 15, 1967

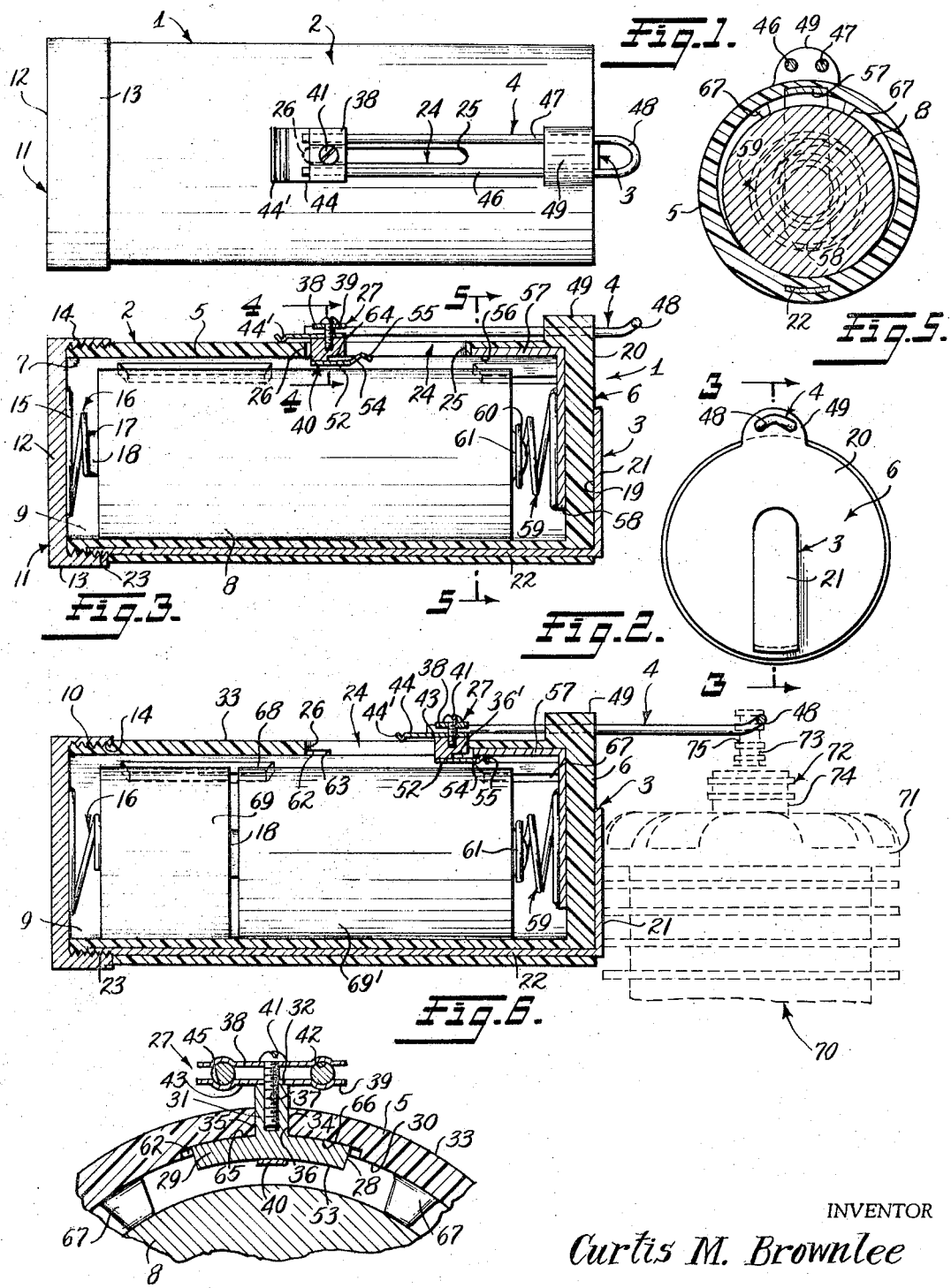

3,336,165
BATTERY HOLDER
Curtis M. Brownlee, 2105 NW. 59th Place,
Oklahoma City, Okla. 73112
Filed Sept. 16, 1965, Ser. No. 487,782
14 Claims. (Cl. 136—173)

This invention relates generally to a battery holder and particularly to a battery holder, which with a battery therein, is used as an external source of power, and which includes a unique electrode arrangement for connecting the battery to a load.

More specifically, the invention relates a protective holder for a rechargeable flashlight type battery, the holder having an electrode arrangement particularly adapted to temporarily connect the battery in the holder to the glow plug of a miniature internal combustion engine during starting.

A unique feature of the battery holder and the electrode arrangement is a movable electrode so arranged that the battery cannot be accidentally discharged when the electrode is moved to a non-use position.

Miniature internal combustion engines of the glow plug type require an external source of power to activate the heater element of the glow plug during starting of the engine. To start such engines, it is customary to connect an external source of power, usually in the form of a dry cell battery, to the center terminal of the glow plug and to ground the other terminal of the battery to the cylinder of the engine in which the glow plug is mounted. The basic idea is to heat the heater element of the glow plug to incandescence with current from the battery so that the engine can be started. After the engine starts, the glow plug heater retains incandescence from the heat due to combustion and the battery may then be disconnected from the glow plug.

In the past, it has been customary to use "A" size dry cell batteries which have screw type terminals, and connect wires from the terminals to the glow plug terminal and engine cylinder with alligator clips or some other form of removable connector. However, since these A-size batteries are large and bulky, they are somewhat cumbersome to use. Although attempts have been made to use batteries of the flashlight type; i.e., D-size batteries, which measure about an inch in diameter and about two and a half inches in length, such attempts have also proven unsatisfactory since these relatively small dry cells are rapidly discharged because of the current requirements of the glow plug.

Recently, rechargeable flashlight type batteries have become available, these batteries being of the nickel cadmium type. With these batteries, it is feasible to use batteries of D and F size, for example, as the power source for energizing the glow plug of miniature engines. However, these batteries do not have screw thread terminals but merely have an electrode button at the center of one end of the battery and a metallic casing, the center of which at the other end of the battery, provides the other terminal for the battery. Hence, it is necessary to solder, tape or otherwise connect wires or electrodes to the terminals of the battery to permit connecting same to the glow plug and cylinder of the miniature engine which is to be started. Temporary connections effected by taping wires or electrodes to the terminals have proven unsatisfactory because the wires or electrodes frequently become disconnected from the terminals of the battery and there is considerable delay in reconnecting the wires or electrodes to the terminals. Where wires or electrodes are permanently connected tn the battery, for example, by soldering, the dimensions of the battery are changed and frequently no longer fit the readily available battery chargers for cells of this type. Another disadvantage of permanently connected electrodes is that the batteries are frequently carried in the pocket of the user and may accidentally discharge because of keys or other metal objects also carried in the pocket of the user. Such accidental discharge of the battery in the pocket of the user can also be dangerous to the user because the metal objects can heat sufficiently to cause burns.

Applicant, with this invention, has solved the problems encountered in the past relating to the use of rechargeable batteries and dry cells of the flashlight type as an external source of power for starting miniature internal combustion engines. In accordance with applicant's invention, a holder of insulated material is provided for the battery, the holder including conductors which positively connect to both terminals of the battery, and an electrode arrangement which facilitates using the battery to start miniature engines merely by holding the battery holder in the hand of the user with one electrode engaging the terminal of the glow plug and the other electrode engaging the engine cylinder. Since there is no positive mechanical connection between the battery holder and the engine or glow plug, the battery is disconnected from the engine after it starts merely by moving the holder away from the engine. The possibility of burns to the user or of accidental discharge of the battery is positively prevented by providing a movable electrode which is manually retractable to a non-use position in which the electrode is disconnected from one terminal of the battery contained in the holder.

Correspondingly, it is an object of this invention to provide a battery holder for batteries of the flashlight type, the holder including a movable electrode to facilitate the use of the holder and battery as an external source of power.

Another object of the invention is a battery holder which facilitates the use of a battery contained therein as an external source of power for starting miniature internal combustion engines of the glow plug type.

A further object of this invention is a battery holder for rechargeable batteries in which the rechargable battery is resiliently held in the holder to avoid damage to the battery in the event of shock and vibrations which normally would be transmitted to the battery during the use of the holder and battery as an external source of power.

A further object is a battery holder of the type described including a movable electrode, a fixed electrode, and a switch which automatically disconnects one of the electrodes from the battery when the movable electrode is moved to a non-use position.

A further object is a battery holder having a fixed electrode and a movable electrode shaped and arranged to connect a battery within the holder to the glow plug of a miniature internal combustion engine when the movable electrode is in an extended use position, and in which the battery is automatically disconnected from the movable electrode when the electrode is retracted to a non-use position.

A further object is a battery holder having an electrode movable between an extended use position and a retracted non-use position, and which further includes a locking device to automatically lock the electrode in the non-use position to prevent accidental extension thereof.

A further object is a battery holder of the type described in which the battery contained therein is readily removable and replaceable, and the movable electrode is adjustable.

A still further object of the invention is a battery holder including an extendable electrode and which further includes provision for receiving batteries of several different sizes therein, depending on the needs of the user.

A further and extremely important object is a battery holder of the type described which is inexpensive to manufacture, convenient to use for its intended purposes and occupies little space more than the battery itself.

In order that the manner in which the foregoing and other objects attained in accordance with the invention can be understood in detail, particularly advantageous embodiments thereof will be described with reference to the accompanying drawings, which form a part of this specification, and wherein:

FIG. 1 is a top plan view of the battery holder showing the movable electrode in its retracted position;

FIG. 2 is an end elevational view of the battery holder of FIG. 1;

FIG. 3 is a side elevational view in section of the battery holder taken along the lines 3—3 of FIG. 2 and showing the electrode in its retracted position;

FIG. 4 is an enlarged fragmentary vertical sectional view taken along lines 4—4 of FIG. 3;

FIG. 5 is a vertical sectional view taken along lines 5—5 of FIG. 3; and

FIG. 6 is a side elevational view in section of the battery holder with the movable electrode extended, with the battery holder shown in operating position for energizing the glow plug of a miniature internal combustion engine, and with a different battery arrangement shown within the battery holder.

Turning now to the drawings in detail, and particularly to FIGS. 1–3, there is illustrated a battery holder 1 comprised of a casing 2, a fixed electrode 3 secured to the casing, and a movable electrode 4 slidably mounted on the casing.

Casing 2 is molded from electrically insulating plastic material such as polyethylene or polystyrene and has a body portion in the form of an elongated tubular sidewall 5 having one end closed by a flat endwall 6. Endwall 6 extends substantially perpendicular to the longitudinal axis of sidewall 5 and is fixed to sidewall 5 by integrally molding the end wall with the sidewall. The opposite end 7 of the sidewall is open and substantially unobstructed to permit inserting a battery 8 into a generally cylindrical chamber 9 defined by sidewall 5 and endwall 6 of the casing. Sidewall 5 is provided with external threads 10 adjacent open end 7 to permit threading a closure cap 11, having an endwall 12 with an integral skirt 13 provided with internal threads 14, onto open end 7 of the sidewall. Closure cap 11 is formed from metal with good electrically conducting characteristics. The large end 15 of a metal helically wound frustoconical compression spring 16 is secured by soldering or welding at the inner surface of endwall 12 of the cap. The spring extends axially into chamber 9 and terminates at a small end 17 which contacts a positive terminal 18 of battery 8.

As best seen at FIGS. 2 and 3, fixed electrode 3 is in the form of a flat strip of metal having an inner face 19 which lies flat against a flat outer face 20 of endwall 6, and has a flat exposed face 21 which is generally parallel to face 20 of endwall 6.

As best seen at FIG. 2, fixed electrode 3 has a length approximately two-thirds of the diameter of face 20 of endwall 6. A conductor portion 22 of fixed electrode 3 extends at right angles to face 21 of the electrode. Conductor portion 22 is imbedded in the material of sidewall 5 and extends substantially the length of the sidewall so that it is wholly enclosed by the electrically insulating plastic of the sidewall except at a short end portion 23 adjacent end 7 of the sidewall. As shown at FIG. 3, end portion 23 of conductor 22 forms part of external threads 10 so that a good electrical connection is provided between fixed electrode 3 and closure cap 11 when the cap is threaded onto the end of the sidewall.

Formed in sidewall 5 at a location diametrically opposite conductor 22 is a slot 24 which is elongated axially of sidewall 5. Slot 24 is offset longitudinally of the casing so that end 25 of the slot is substantially closer to endwall 6 than end 26 of the slot is to open end 7. It is to be noted that end 26 of the slot is approximately midway between endwall 6 and open end 7 of sidewall 5.

Slidably mounted in slot 24 is a slide assembly 27. Slide assembly 27 is comprised of a metal inner connector element 28 having a flange 29 which is arcuately curved to conform generally with the curvature of inner surface 30 of sidewall 5, and an upstanding web 31 connected to the flange and which projects through slot 24 to provide a flat end face 32 that extends radially outwardly of outer surface 33 of sidewall 5.

Web 31 is generally rectangular and has a thickness, as measured between side faces 34 and 35 (FIG. 4), which is slightly less than the distance between side edges 36 of slot 24 to provide clearance for sliding movement of inner connector element 28 longitudinally of the slot. Web 31 is substantially longer than it is thick so that side faces 34 and 35 are elongated longitudinally of slot 24 to prevent rotation of connector element 28 relative to the slot. The flange 29 projects laterally of web 31 to prevent inner connector element 28 from passing through slot 24 in a radially outward direction, and the front portion of flange 29 is cut away as at 36' so that the length of the flange, measured axially of the casing, is about half the length of web 31 and extends to the rear edge of the web. Web 31 is provided with an internally threaded bore 37 having its axis generally perpendicular to end face 32 of the connector element.

Slide assembly 27 also includes an electrode mounting plate 38, a leaf type biasing spring 39, and a slide contact 40. Mounting plate 38 is generally rectangular and is formed from flat sheet metal. An opening is formed at the center of the plate to receive shank of a screw 41. The plate is deformed to provide a pair of spaced apart recesses 42 of arcuate curvature, the recesses being parallel with the axis of sidewall 5 and being spaced equally on each side of the axis of screw 41. Biasing spring 39 is formed from a rectangular piece of flat sheet metal with good spring properties and includes a body portion 43 of the same width as mounting plate 38, and a spring portion 44 which projects toward open end 7 of the casing. Spring portion 44 terminates at a V-shaped tip 44' that is wider than slot 24 and engages surface 33 of sidewall 5 to bias slide assembly 27 radially outwardly relative to the sidewall. The bottom face of V-shaped tip 44' provides a smooth surface which slides easily on the sidewall during movement of slide assembly 27 axially of casing 2. The material of body portion 43 is deformed to provide a pair of recesses 45 aligned with, of the same curvature as, and face toward recesses 42. The center of body portion 43 of spring 39, has an opening to receive screw 41.

As best seen at FIGS. 1 and 2, movable electrode 4 is formed from a piece of stiff wire of circular cross-section which is bent to generally hairpin shape to provide an electrode having a pair of parallel legs 46 and 47 and a curved end 48 connecting the legs and curving upwardly as shown in FIG. 2. The free ends of legs 46 and 47 are secured to slide assembly 27 by disposing the ends of the legs between mounting plate 38 and biasing spring 39 in such a manner that the legs 46 and 47 fit into recesses 42 and 45, respectively, of the mounting plate and the biasing spring. The legs are secured by tightening screw 41 to clamp the legs between mounting plate 38 and biasing spring 39.

In addition to the support provided by slide assembly 27, legs 46 and 47 of movable electrode 4 are also supported adjacent endwall 6 of the casing. Such supporting is provided by a semi-cylindrical projection 49 molded integral with the casing and extending upwardly from adjacent the region of endwall 6. Projection 49 is provided with a pair of spaced apart circular openings aligned with legs 46 and 47 and through which the legs extend for sliding movement relative to the casing.

Slide contact 40 is formed from sheet metal having good spring and electrical conducting properties. Slide contact 40 has a body portion 52 secured as by soldering or welding to the radially inner face 53 of flange 29. As can be seen with reference to FIGS. 3 and 4, slide contact 40 has a width sufficiently less than the distance between edges 36 of slot 24 to permit the upwardly projecting V-shaped tip 54 at the end of the leaf spring arm of contact to extend slightly into slot 24. This construction prevents excessive wear of the contact tip 55 which would normally occur were the arm and tip of sufficient width to ride on inner surface 30 of sidewall 5 at each side of slot 24.

With slide assembly 27 in the extended position shown at FIG. 6, contact tip 55 of slide contact 40 engages an exposed contact face 56 of a conductor 57. Conductor 57 is formed from a flat strip of metal with good electrical conducting characteristics and has a leg 58 projecting at right angles thereto. Conductor 57 is imbedded in the material of sidewall 5 and is secured thereto with adhesive. Contact face 56 is substantially flush with inner surface 30 of the sidewall and is exposed to be engaged by tip 55 of the slide contact 40. Leg 58 lies flat against the inner surface of endwall 6 and extends diametrically thereof. Secured to leg 58 of conductor 57 as by soldering or welding is a frusto-conical helically wound compression spring 59 which is substantially similar to spring 16 and which has its small end 60 facing toward the small end 17 of spring 16. The small end 60 of spring 59 functions as a contact to engage the negative terminal 61 of battery 8 to electrically connect negative terminal 61 to movable electrode 4 via conductor 57, and slide assembly 27, but only when the slide assembly is in the position of FIG. 6 in which slide contact 40 engages conductor 57, and movable electrode 4 is extended.

Adjacent end 26 of slot 24 is a recess 62 formed in the inner surface of sidewall 5. The recess extends circumferentially a distance slightly greater than the distance between the side edges of flange 29, as best seen at FIG. 4. Recess 62 is also slightly longer, measured in a direction axially of sidewall 5, than the corresponding length of flange 29. An edge 63 of recess 62, faces toward edge 26 of slot 24 to provide a stop face. Due to the action of leaf spring 39 which biases slide assembly 27 radially outwardly, flange 29 is urged into recess 62 whenever the slide assembly is moved to the position of FIGS. 1 and 2, namely, the retracted position for movable electrode 4. When in this position, the forward edge 64 of flange 29 is behind edge 63, and the curved radially outer surface 65 of flange 29 engages the correspondingly curved inner surface 66 of recess 62. In order to move the slide assembly and electrode from the retracted position of FIG. 2 to the extended position of FIG. 6, it is necessary to first depress the slide assembly radially inwardly of the casing to move edge 64 of flange 29 radially inwardly of stop face 63. Hence, by virtue of the interaction of stop face 63 and flange 29, accidental extension of the electrode is positively prevented.

To prevent interference of battery 8 with slide assembly 27, several spacer ribs 67 and 68 are provided within casing 2. With reference to FIGS. 3 and 4, it will be observed that a pair of spacer ribs 67 are formed integral with sidewall 5 and extend from adjacent endwall 6 of the casing. Also, a pair of spacer ribs 68 are formed integral with sidewall 5 in the region between end 26 of slot 24 and open end 7 of the casing, the axial distance between the ribs 67 and 68 being greater than the axial travel of slide assembly 27. Each rib of each pair is equi-distantly spaced circumferentially from the centerline of slot 24. Each of the ribs 67 and 68 extends radially inwardly of surface 30 of sidewall 5 a distance slightly greater than the maximum distance that the inner surface of slide contact 40 can be moved inwardly of the casing by depressing slide assembly 27. Hence, ribs 67 and 68 maintain battery 8 so that its outer surface is spaced a sufficient distance from the inner face of slide contact 40 that there is no chance for engagement of the slide contact with the surface of the battery.

Battery 8 of FIG. 3 is an F-size battery with a diameter of about 1⅓" and a length of approximately 3½". However, it is sometimes desirable to use a D-size battery which is of the same diameter as the F-size battery but is only about 2⅓" long. To use the D-size battery with applicant's battery holder, it is merely necessary to provide a cylindrical plug 69 as shown at FIG. 6. Plug 69 is cylindrical and has the same diameter as the diameter of the D-size battery. In the embodiment shown, the length of the plug is equal to the difference in length between an F-size and a D-size battery. Plug 69 is merely a right circular cylinder formed of metal which is preferably hollow to decrease its weight. Plug 69 functions as a conductor to electrically connect frusto-conical spring 16 to positive terminal 18 of D-size battery 69'.

In use, cap 12 is removed and a battery 8 is slipped through open end 7 of the casing and into chamber 9. The cap is then replaced, frusto-conical springs 16 and 59 having a sufficient axial length that each of these springs is compressed by the battery when the cap is replaced on the casing. Since each spring is compressed, it is apparent that the battery is resiliently suspended in a direction axially of casing 2. Such resilient suspension is quite significant since rechargeable nickel cadmium batteries can be easily damaged by shock and vibration. By suspending the battery resiliently within the casing, shock and vibration which would normally damage the separators of rechargeable nickel cadmium batteries are substantially attenuated by the action of the springs.

FIG. 3 shows battery holder 1 with movable electrode 4 in its retracted position. In this position, closed end 48 of the movable electrode extends only a short distance beyond endwall 6 of the casing. With movable electrode 4 in this position, contact tip 55 of slide assembly 27 is spaced from contact surface 56 of conductor 57 and it is thus apparent that movable electrode 4 is disconnected from negative terminal 61 of battery 8. However, fixed electrode 3 is connected to the positive terminal 18 of battery 8 by the series electrical circuit including frusto-conical spring 16, metal cap 12, conductor 22 and its threaded portion 23, and fixed electrode 3. With the slide assembly and movable electrode in the retracted position of FIG. 3, surface 65 of flange 29 seats in recess 62 and front edge 64 of the flange is behind stop face 63 of recess 62, the flange being held in the recess by the action of biasing spring 39 which urges slide assembly 27 in a direction radially outwardly of the casing. If a force parallel with the axis of casing 2 is applied to either movable electrode 4 or to slide assembly 27 in an attempt to extend the electrode, such movement will be prevented by the engagement of front edge 64 of flange 29 with stop face 63 of recess 62. However, if a radially inward force is applied to slide assembly 27, flange 29 will be depressed radially inwardly of stop face 63 and movable electrode 4 may then be easily moved to the extended position of FIG. 6. In this extended position, fixed electrode 3 remains connected to the positive terminal of the battery. In addition, movable electrode 4 is electrically connected to the negative terminal of the battery by the electrical conductors of the series electrical circuit including compression spring 59, leg 58, conductor 57, slide contact 40, and slide assembly 27.

FIG. 6 shows the battery holder in use for starting of a miniature internal combustion engine 70 (shown in phantom lines) and having a cylinder 71 and a glow plug 72 threaded into the top of the cylinder and communicating with the combustion chamber of the engine. Glow plug 72 is a standard glow plug and has a metal terminal 73 which is electrically insulated from the body portion 74 which is threadedly received in cylinder 71. To heat the glow element of the glow plug 72, it is merely necessary to extend movable electrode 4 and contact terminal 73 of the glow plug with the movable electrode while simultaneously engaging the side of cylinder 71 with fixed electrode 3. To facilitate maintaining proper contact between the two electrodes of the battery holder and glow plug 72, the loop at closed end 48 of movable electrode 4 is hooked over the cylindrical terminal 73 of the glow plug. With the movable electrode hooked over the glow plug, the battery holder need only be guided and can even be released while face 21 of fixed electrode 3 remains in engagement with the side of cylinder 71, to complete the circuit to the glow plug. If the length of electrode 4, when in the extended position of FIG. 6, is either too short or too long to permit hooking the battery holder over the glow plug, the relative length of the electrode may be easily adjusted by loosening screw 41 and adjusting the electrode axially relative to slide assembly 27. In the preferred embodiment shown in FIGS. 3 and 6, the movable electrode has a length sufficient to suspend the battery holder from a relatively large internal combustion engine of the miniature type. Hence, when used with an engine having a cylinder with a smaller diameter than the one shown in FIG. 6, the effective length of the electrode may be shortened by virtue of the adjustable mounting provided by mounting plate 38 and screw 41.

As soon as engine 70 is started, the user of the battery holder need merely pivot the battery holder upwardly around end 48 and move same slightly toward the engine to permit the loop to clear the groove 75 of terminal 73 of the glow plug. This disconnecting of the battery holder from engine 70 can be easily accomplished with one hand, and as soon as it is disconnected, the user can slide the electrode to the retracted position of FIG. 3 and slip the battery holder into his pocket. Regardless of what keys or other metal objects are in the user's pocket, there is no danger of accidentally causing a short circuit between fixed electrode 3 and movable electrode 4 since the movable electrode is disconnected from its associated terminal of the battery. Since it is usually necessary to clear the area adjacent the model airplane or other model that engine 70 powers, immediately after the engine starts, it is indeed an advantage to be able to merely slip the battery holder of this invention into one's pocket. In addition, it may be observed with reference to FIG. 3, that the battery holder, with electrode 4 retracted, is only slightly longer axially and only slightly greater in diameter than battery 8 and can thus conveniently be carried in the pocket of the user. Since there are no soldered or other permanent connections at the terminal of the battery, the battery may be removed and recharged with a readily available battery charger for nickel cadmium and other batteries of the flashlight type. In addition, since the movable electrode 4 is supported for sliding movement by both integral projection 49 of the casing and slide assembly 27, the battery holder is rugged and can be misused considerably without danger of damage to the battery holder, or to the battery itself because of the resilient suspension for the battery provided by springs 16 and 59. It will also be observed with reference to FIGS. 3 and 6, that even if the battery holder is dropped so that end 48 of movable electrode 4 strikes the ground, the axial force caused by such impact will normally tend merely to slide the electrode toward its retracted position without bending or otherwise damaging movable electrode 4.

Although a preferred embodiment of the battery holder of this invention has been shown and described with the battery holder oriented in a particular position, it is to be understood that the battery holder may be used in any convenient position and that numerous changes and variations may be made in the structure and arrangement disclosed without departing from the scope of this invention as defined in the appended claims.

What is claimed is:
1. A battery holder comprising in combination
 a casing;
 a first electrode mounted on said casing;
 a second electrode mounted on said casing for movement to
  an extended position, and
  a retracted position;
 a first conductor connected to said first electrode;
 a second conductor connected to said second electrode;
 said casing being adapted to receive a battery with one terminal of the battery electrically connected with said first conductor, and another terminal of the battery electrically connected with said second conductor, whereby said electrodes are connected to the terminals of the battery via said conductors; and
 means responsive to movement of said second electrode from its extended position to its retracted position to disconnect said second electrode from said second conductor;
 whereby accidental discharge of said battery is prevented whenever said second electrode is in its retracted position.
2. A battery holder in accordance with claim 1, and which further includes
 means mounting said second electrode for sliding movement relative to said casing.
3. A battery holder in accordance with claim 1 in which
 said casing is elongated;
 said first electrode is exposed at one end of said casing; and
 said second electrode extends beyond said one end of said casing when said second electrode is in its extended position.
4. A battery holder in accordance with claim 1 in which said casing is comprised of
 a hollow elongated body,
 an end wall at one end of the body, and
 a removable closure at the other end of the body to facilitate removal and replacement of a battery adapted to be received in the body;
  said first electrode being fixed to said casing adjacent said end wall; and
  said second electrode being movable beyond said end wall and said first electrode.
5. A battery holder in accordance with claim 1 in which said casing is comprised of a hollow elongated body; and which further includes
 a first spring at one end of said body, and
 a second spring at the other end of said body;
 said first and second springs suitable for engaging opposite ends of a battery in said casing to attenuate the transmission of shock and vibration therefrom.
6. A battery holder in accordance with claim 5 in which said first conductor is connected to one of said springs, and said second conductor is connected to the other of said springs,
 one of said springs suitable for engaging one battery terminal, and the other suitable for engaging the other battery terminal, thereby connecting said first and second conductors to the respective battery terminals.
7. A battery holder in accordance with claim 1 which further includes
 latch means to prevent accidental movement of said second electrode from said retracted position toward said extended position.
8. A battery holder adapted to receive a battery and of particular utility as an external source of power for starting miniature engines of the glow plug type comprising, in combination
 a casing adapted to receive a battery therein;
 means to retain a battery in said casing;

a first electrode mounted on said casing;
a second electrode;
means mounting said second electrode for movement to
    a first position in which said second electrode is extended, and
    a second position in which said second electrode is retracted;
conductor means suitable for connecting one terminal of a battery to said first electrode and another terminal of said battery to said second electrode;
latch means automatically effective upon movement of said second electrode to said second position to prevent accidental movement of the electrode toward said first position; and switch means to automatically disconnect one of said electrodes from said conductor means upon movement of said second electrode to said second position.

9. A battery holder in accordance with claim 8 in which
a movable contact of said switch means is connected to said means mounting said second electrode for movement, and
said second electrode is disconnected from said conductor means, upon movement of said second electrode to its second position.

10. A battery holder in accordance with claim 8 in which
said casing is elongated and has a generally cylindrical side wall, said side wall having an axially extending slot; and
said means mounting said second electrode for movement is comprised of a connector element secured to said second electrode and retained in said slot for sliding movement relative to said casing.

11. A battery holder adapted to receive a battery and of particular utility as an external source of power for starting miniature engines of the glow plug type comprising, in combination
a casing comprised of
    an elongated side wall defining a space suitable for accommodating a battery,
    an end wall fixed to one end of the said wall and extending transversely thereof, and
    a cover removably secured to the other end of the side wall to retain a battery in the space within the side wall;
a first electrode carried by said casing and exposed adjacent said end wall;
a second electrode, said second electrode being elongated in a direction axially of said side wall;
means mounting said second electrode on said casing for movement to
    an extended position, and
    a retracted position;
a first conductor suitable for connecting between said first electrode and one terminal of an accommodated battery;
a second conductor suitable for connecting between said second electrode and the other terminal of said accommodated battery; and
switch means operable in response to movement of said second electrode to said second position to disconnect said second electrode from said second conductor;
whereby accidental discharge of said accommodated battery is positively prevented whenever said second electrode is in its retracted position.

12. A battery holder in accordance with claim 11 and which further includes
guide means connected to said casing to guide a portion of said second electrode, said guide means permitting sliding movement of said second electrode only in a direction axially of said side wall.

13. A battery holder in accordance with claim 11 and in which
said casing is formed from plastic material having electrically insulating properties;
said first and second conductors are each imbedded in said plastic material of said casing; and
said means to disconnect said second electrode from said accommodated battery is a switch comprised of
    a fixed contact formed by a portion of said second conductor, and
    a movable contact carried by said means mounting said second electrode on said casing;
said contacts being spaced apart whenever said electrode is in its retracted position.

14. A battery holder in accordance with claim 11 and in which
said second electrode is formed from a U-shaped piece of electrically conducting wire,
said closed end of said U-shaped electrode extends beyond the end wall of said casing, and
said electrode is elongated axially of the casing.

References Cited
UNITED STATES PATENTS

| | | | |
|---|---|---|---|
| 1,188,408 | 6/1916 | Burgess | 136—110 |
| 2,928,067 | 3/1960 | Broberg et al. | 339—200 |
| 2,990,496 | 6/1961 | Sullivan | 317—87 |

WINSTON A. DOUGLAS, *Primary Examiner.*

D. L. WALTON, *Assistant Examiner.*